April 25, 1961

R. B. SMITH 2,981,286

FLUID DEVICE

Filed Aug. 29, 1957

INVENTOR.
ROY B. SMITH

BY
Jerome R. Cox
ATTORNEY

April 25, 1961 R. B. SMITH 2,981,286
FLUID DEVICE
Filed Aug. 29, 1957 3 Sheets-Sheet 3

INVENTOR.
ROY B. SMITH
BY
Jerome R. Cox
ATTORNEY

United States Patent Office 2,981,286
Patented Apr. 25, 1961

2,981,286
FLUID DEVICE

Roy B. Smith, Union Township, Fayette County, Ohio (Rte. 5, Washington Court House, Ohio), assignor to William E. Knepper, as trustee Filed Aug. 29, 1957, Ser. No. 681,089

5 Claims. (Cl. 137—620)

General definition

The inventions disclosed and/or illustrated in this application relate in general to timing devices and more specifically to fluid actuated automatic relay devices of the delayed reaction type.

It is oftentimes desirable to incorporate in the structure of a fluid actuated or fluid driven machine a means for automatically actuating one component of the machine in timed relationship with a predetermined number of operating cycles of the basic machine. For example, it has been found desirable to automatically lubricate moving parts of an automotive braking system in direct response to a specific number of sequential operations of the braking system. Experience has shown that too frequent lubrication of the bearing surfaces of such a system often results in over-lubrication, a consequent waste of lubricant, frequent damage to brake linings and further undesirable complications. Such complications are especially critical in connection with air operated braking systems. The incorporation of a fluid actuated timing device in such a machine to automatically control the periodic lubrication of bearing surfaces of fluid driven components in direct response to a predetermined number of operating cycles of the machine permits automatic lubrication in proportion to existing lubrication requirements and will serve to provide adequate lubrication while preventing excessive lubrication and the attendant undesirable consequences.

Objects

One of the objects of my invention is to provide means for automatically effecting a single operation of one fluid actuated device in response to a plurality of sequential operations of another fluid actuated device.

A further object of my invention is to provide means for automatically effecting a plurality of operations of a fluid actuated device, each operation occurring in response to a plurality of sequentially timed fluid pressure impulses.

A further object of my invention is to provide means for automatically actuating a three-way fluid control valve in response to a predetermined number of pressure impulses.

A further object of my invention is to provide a novel selector valve apparatus which may be automatically repositioned from one alternate flow control position to another in response to pressure impulses.

A further object of my invention is to provide an automatically actuated relay valve for controlling one independent fluid system in response to a predetermined number of sequential operating cycles of a second independent fluid system.

A further object of my invention is to provide fluid operated means comprising a controlling fluid system for controlling one independent fluid system in response to pressures generated in another independent fluid system, wherein the controlling fluid system may be entirely independent of both the actuating fluid system and the controlled fluid system.

Further objects and features of my invention will be apparent from the subjoined specification and claims when considered with regard to the accompanying drawings.

Drawings

In the drawings which disclose embodiments of my invention:

Fig. 1 is a view in section of one embodiment of my invention;

Fig. 2 is a view in section of a portion of a modification corresponding to the lower portion of the device of Fig. 1 showing the modified portion only of an alternative embodiment; and Fig. 3 is a view in section of a portion of a modification corresponding to the lower portion of the device of Fig. 1 showing the modified portion only of an alternative embodiment with portions of outwardly disposed elements broken away.

Detailed description

Figure 1:
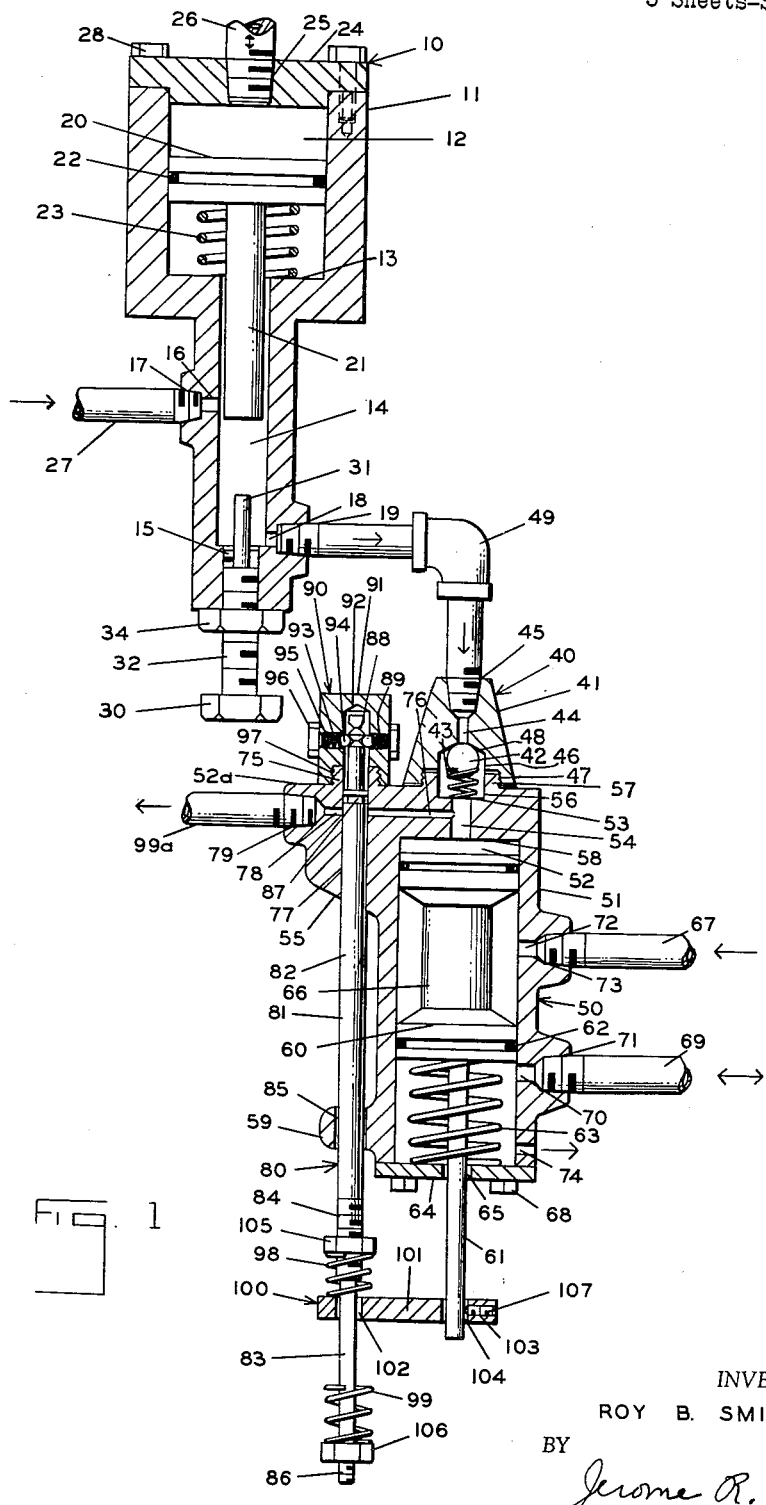

Referring to the drawings for a detailed description of my invention, the preferred embodiment of my device may be seen in Fig. 1 where I have shown fluid pump means designated generally as 10, check valve means 40, piston valve means 50, return valve means 80, valve detent means 90, and return valve actuating means 100, each of which is described hereinafter in detail.

Pressure actuated fluid pump means 10 has a body portion 11 which is formed with an upper cylinder bore 12, a pump bore 14 and a threaded lower bore 15 in mutual coaxial alignment and in cooperative intercommunication with opposite ends of body 11. Upper cylinder bore 12 is longitudinally disposed within body 11 in communication with the upper end thereof and is formed with any suitable diameter and depth dimensions required to afford the piston displacement characteristics which are desired for pump means 10. Bore 12 terminates in a lower annular shoulder face 13. Pump bore 14 is formed with a diameter less than that of bore 12, is disposed in axial alignment therewith, is in peripheral communication with annular shoulder 13, and extends from shoulder 13 along the longitudinal axis of body 11 a distance greater than the length dimension of cylinder 12. Threaded bore 15 has a diameter preferably less than that of bore 14, is axially aligned therewith and is in intercommunication with the lower end of pump bore 14 and with the lower outer end of body 11.

Pump means 10 also has a piston 20 of well known configuration, provided with a suitable packing ring such as ring 22, and having a diameter sufficient to permit said piston to be reciprocable within cylinder 12 under fluid pressure. Plunger 21 is secured by suitable well known means to the lower face of piston 20. Plunger 21 is formed with a diameter sufficient to permit it to be snugly, yet slidably, reciprocated longitudinally within pump bore 14, and with a length greater than that of cylinder 12 but less than that of bore 14. Compression spring 23 of well known configuration is disposed concentrically about plunger 21 within cylinder 12 and bears upon shoulder face 13 and the lower face of piston 20 and cooperates therewith for constantly urging piston 20 and plunger 21 toward the upper ends of cylinder 12 and bore 14 respectively.

Cylinder head 24 is formed with a centrally disposed threaded bore 25 in intercommunication with opposite faces of head 24 and having a diameter and thread suitable for receiving a suitable actuating fluid conduit fitting such as conduit 26. Head 24 is secured in pressure sealed engagement with the upper end of pump body 11 by suitable means such as bolts 28 for rendering cylinder 12 pressure tight and for containing piston 20 and return spring 23 within cylinder 12 and containing plunger 21 within bore 14.

Pump body portion 11 previously described in part is further formed with a plurality of laterally disposed passages 16 and 18 of suitable configuration, each said passage being in intercommunication with the circumferential wall of bore 14 and with an outer surface of body 11. The inner opening of passage 16 is spaced from the upper end of bore 14 a sufficient distance for said opening to be unrestricted when plunger 21 is in the uppermost position to which the plunger is urged by spring 23. The inner opening of passage 16 is similarly spaced from the lower end of bore 14 a sufficient distance that any downward movement of plunger 21 from the previously described uppermost position will serve to close or substantially close the inner opening of passage 16. The inner opening of passage 18 may be located in any suitable position adjacent the lower end of bore 14. The outer portions of passages 16 and 18 are provided with threaded counterbores 17 and 19 respectively, each said counterbore having a diameter and thread suitable for cooperatively engaging appropriate threaded conduit fittings.

Pump means 10 is further provided with a limit screw 30 having a threaded portion 32 formed with an appropriate diameter and thread for being threadably engaged within threaded bore 15 of body 11. Screw 30 is also formed with an integral stop pin 31 oppositely disposed from the head of said screw, axially aligned with threaded portion 32, having a diameter less than that of portion 32 and having an appropriate length configuration. Locking nut 34 is of well known configuration suitable for cooperating with screw 30 to retain said screw in any desired threaded engagement relationship with threaded bore 15.

Check valve means 40 comprises valve cap 41, valve ball 42, and valve spring 43 each of which is described hereafter in detail.

Valve cap 41 is formed with the general frusto-conical outer configuration shown in Fig. 1 and has a vertically disposed axial bore 44 of appropriate diameter, in communication at its upper end with upper tapped counterbore 45 located in the upper plane surface of cap 41. Counterbore 45 has a diameter and thread suitable for threadably engaging an appropriate threaded conduit and is connected with bore 19 by a suitable conduit such as conduit 49. Axial bore 44 communicates at its lower end with valve counterbore 46 which has a diameter greater than that of an appropriate valve ball 42 of well known configuration. Valve counterbore 46 communicates at its lower end with lower tapped counterbore 47, centrally disposed in the lower plane face of cap 41 and having any appropriate diameter, depth and thread configurations. Valve counterbore 46 is further formed with a downwardly directed valve seat face 48 of suitable tapered configuration.

Valve spring 43 is a compression spring of well known coil configuration having an inside diameter when fully compressed less than the diameter of ball 42 and a fully compressed outside diameter not greater than the diameter of valve counterbore 46.

Piston valve means 50 comprises housing 51, spool piston 60, return spring 63 and retainer plate 64, each of which is described hereafter in detail.

Housing 51 is formed to the general outer configuration shown in Fig. 1 with an upwardly directed face 52a of substantially plane configuration. Face 52a is further formed with an upwardly extending embossed portion 57 of substantially cylindrical configuration and positioned in axial alignment with the longitudinal axis of housing 51. Portion 57 is provided with suitable threads on its outer circumferential surface and has a suitable height, diameter and thread configuration for threadably engaging lower threaded counterbore 47 of check valve cap 41.

Housing 51 is further formed with axial bore 52 of suitable diameter and length and having its upper end in axial communication with the lower end of counterbore 56 which in turn communicates at its upper end with the upwardly disposed face of boss 57. Counterbore 56 has a diameter equal with that of valve bore 46 of check valve cap 41 and may be formed to any convenient depth dimension. Axial bore 54 is in communication at its lower end with upper wall 58 of cylinder bore 52 which is in coaxial alignment with bore 54 and with the longitudinal axis of housing 51. Cylinder bore 52 is in communication at its lower end with the lower end of housing 51 and is formed with any suitable diameter and length dimensions required to contain piston 60 and spring 63 (both described hereafter in detail) and to afford a maximum cubic piston displacement capacity greater than that afforded by bore 14 in cooperation with plunger 21 of pump means 10.

Piston 60 is formed to the general configuration shown in Fig. 1 with a circumferential groove 66, and has a major diameter adjacent its opposite ends sufficient to permit said piston to be slidably reciprocable within cylinder 52. Piston 60 is provided with suitable pressure sealing rings of well known configuration positioned in appropriate circumferential ring grooves adjacent the upper and lower ends of said piston.

Piston rod 61 is secured by suitable means to piston 60, is positioned coaxially therewith and extends downwardly a suitable distance from the lower face of said piston 60. Return spring 63 is a compression spring of well known coiled configuration and is disposed about rod 61 in position for constantly bearing upon the lower end of piston 60 and upon retainer plate 64 and for constantly urging piston 60 and rod 61 upwardly within cylinder 52.

Retainer plate 64 is formed with a central opening 65 of sufficient diameter to permit rod 61 to be freely reciprocable therein and is secured to the lower end of housing 50 by suitable fastening means such as cap screws 68 for retaining piston 60 and return spring 63 within cylinder 52.

Housing 51 is further formed with lateral passages 70, 72 and 74 having suitable similar cross-sectional configurations, being radially disposed with respect to cylinder 52 and in communication at their inner ends with the circumferential wall of said cylinder. The outer ends of passages 70 and 72 are provided with tapped counterbores 71 and 73 respectively, having diameters and threads appropriate for threadably engaging suitable conduit connectors. Housing 51 is also formed with a laterally projecting enlarged portion 55 adjacent upper face 52a and extending downwardly therefrom a suitable distance, and a similarly projecting guide boss 59 disposed adjacent the lower end of housing 51 and in vertical axial alignment with the vertical axis of enlarged portion 55. Upper plane face 52a of housing 51 is further formed with an upwardly projecting cylindrical boss 75 in axial alignment with said vertical axis of portion 55, having suitable diameter and height dimensions and being provided with appropriate threads on its outer circumferential surface.

Enlarged portion 55 is provided with a vertically extending bore 77 in coaxial alignment with said vertical axis of portion 55. Bore 77 is in intercommunication at its opposite ends with upwardly disposed plane face of cylindrical boss 75 and with the lower surface of enlarged portion 55 and has a diameter suitable for slidably receiving valve rod 81 (described hereinafter in detail). Guide boss 59 is provided with a vertically extending bore 85 axially aligned with bore 77 and having a diameter equal to that of bore 77. Bore 85 intercommunicates at its opposite ends with the upper and lower surfaces of guide boss 59.

Housing 51 is also provided with coaxially aligned lateral passages 76 and 78 having similar appropriate cross-sectional configurations. Passage 76 is in intercommunication at its opposite ends with the respective circumferential walls of bores 54 and 77. Passage 78 is in intercommunication at its opposite ends with bore 77 and bore 79. Counterbore 79 has an appropriate diameter and thread for threadably engaging a suitable threaded conduit.

Return valve means 80 is formed with the general rod-like configuration shown in Fig. 1 and comprises valve rod 81, which is formed to any suitable length and has an upper portion 82 with a diameter slightly less than that of bore 77, and a lower portion 83 with a diameter less than that of portion 82. Lower portion 83 is provided with suitable threads 86 adjacent its lower end, and upper portion 82 is similarly provided with suitable threads 84 adjacent its lower end. Upper portion 82 is further provided with a circumferentially disposed channel 87 of suitable configuration having a cross-sectional area not less than one-half that of passage 76 of housing 51. Channel 87 is spaced downwardly a suitable distance from the upper end of rod 81. Portion 82 is also provided with a circumferential groove 88, concave in vertical cross-sectional configuration and located adjacent the upper end of rod 81. Circumferential groove 89 is located adjacent said groove 88 on the lower side thereof and spaced therefrom a distance greater than the vertical dimension of passage 76. Groove 89 is similar in cross sectional configuration to groove 88.

Detent means 90 comprises detent body 91, a plurality of detent balls 94, a plurality of detent springs 95 and a plurality of tension adjusting screws 96, each component being described hereafter in detail.

Detent body 91 is formed to the generally cylindrical configuration shown in Fig. 1 and is provided with an axially extending vertical bore 92 having a diameter equal to that of vertical bore 77 of valve housing 51. Bore 97 communicates at its lower end with threaded counterbore 97. Said counterbore 97 is in communication at its lower end with the lower plane face of detent body 91 and has a diameter and threads suitable for threadably engaging threaded boss 75 of housing 51. Detent body 91 is further formed with a plurality of radial bores 93 each being in intercommunication at its inner end with the wall of bore 92 and at its outer end with the circumferential wall of body 91, and having a radius approximately equal to the radius of concavity of grooves 88 and 89 of valve rod 81. The outer portion of each radial bore 93 is provided with threads suitable for threadably engaging a tension adjusting screw 96 of suitable configuration. Detent body 91 is assembled in threaded engagement with threaded boss 75 with bores 92 and 77 in mutual intercommunication and axial alignment. Radial bores 93 are spaced from passage 78 a distance measured longitudinally of combined bores 92 and 77 equal to the distance between groove 88 and channel 87 as measured longitudinally of valve rod 81.

Detent balls 94 have a diameter slightly less than that of bores 93. Detent springs 95 are compression springs of well known coil configuration having a diameter when fully compressed less than that of balls 94 and are longitudinally disposed within radial bores 93 bearing at their opposite ends on one of said balls 94 and upon the inner end of the screw 96 threadably engaged within each of said bores 93.

Return valve actuating means 100 comprises connecting arm 101 formed to the general rectangular configuration seen in Fig. 1 with transverse bore 104 adjacent one of its ends and having a diameter slightly greater than that of rod 61; and with transverse bore 102 extending through arm 101 adjacent its opposite end and having a diameter slightly greater than that of lower portion 83 of valve rod 81. Arm 101 is further formed with a tapped bore 103 in intercommunication with the wall of bore 104 and with the adjacent end-face of arm 101, said bore 103 having a diameter and threads appropriate for threadably engaging a suitable setscrew 107.

Lower portion 83 of valve rod 81 is slidably engaged within bore 102 of arm 101 and piston rod 61 is secured by means of setscrew 107 within bore 104 of said arm 101. Upper stop nut 105 is in threaded engagement with threads 84 of upper portion 82 of piston rod 81 and serves to retain limit spring 98 of suitable configuration concentrically disposed about rod portion 83 intermediate nut 105 and arm 101. Lower stop nut 106 is in threaded engagement with threads 86 of rod portion 83 and serves similarly to retain lower spring 99 concentrically disposed about rod portion 83 intermediate nut 106 and arm 101.

*Operation*

In the operation of the device of my invention described above and illustrated in Fig. 1 of the drawings, conduit 26 is connected in parallel relationship with the controlled output of a source of fluid under pressure. For example, where the device is utilized in conjunction with an air-actuated automotive braking system for automatically controlling the frequency of the lubrication of bearing surfaces in the braking system, conduit 26 is connected to the controlled actuating air conduit (not shown) leading to the air brake mechanism which is to be lubricated.

Conduit 27 is connected to the output conduit of a suitable source of liquid fluid supply such as for instance a reservoir (not shown) containing a suitable quantity of oil, and conduit 99a is connected to the fluid return input conduit of said reservoir.

Conduit 67 is connected to a source of vacuum or fluid under pressure (not shown) suitable for motivating a vacuum or pressure actuated lubricating pump (not shown). Conduit 69 is connected to the actuating vacuum or pressure input conduit of said lubricating pump.

When fluid under pressure is introduced into the brake system described above for illustration purposes, said fluid is also introduced through the parallel connections into conduit 26 and cylinder 12 for driving piston 20 downwardly within cylinder 12. Plunger 21 is thereby driven downwardly within bore 14. When plunger 21 has travelled downwardly a sufficient distance to block the inner opening of lateral bore 16, plunger 21 exerts pressure upon liquid (supplied from the liquid reservoir in a manner described hereafter), contained in bore 14, conduit 49 and passage 44. The force exerted by the liquid within passage 44 overcomes the biasing force of spring 43 and moves ball 42 downwardly from its seat 48 thus permitting liquid to flow from bore 14 through conduit 49 and into valve cylinder 52 under pressure exerted by plunger 21.

The magnitude of downward travel of piston 20 and plunger 21 in response to the previously described introduction of fluid under pressure into cylinder 12 is limited at the point at which plunger 21 contacts the upper end of limiting screw 30 and therefore the volume of fluid displaced from bore 14 into valve cylinder 52 may be varied by adjustably positioning screw 30 longitudinally within threaded bore 15.

The introduction of liquid under pressure into valve cylinder 52 serves to displace valve piston 60 downwardly within cylinder 52 against the biasing force of return spring 63 through an axial distance which is directly proportional to the volume of liquid displaced from bore 14 and into cylinder 52.

When the fluid pressure is released from the actuating conduit connected to conduit 26 and the actuating fluid is permitted to exhaust from pump 10 though conduit 26, piston 20 is urged toward the upper limit of cylinder 12 by the biasing force of return spring 23. Plunger 21, secured to piston 20, is simultaneously carried upwardly within bore 14. When plunger 21 is moved upwardly within bore 14 and the force exerted by the liquid in bore 44 upon ball 42 is released and ball 42 is urged upwardly into engagement with seat 48 by spring 43 and a partial vacuum is created in bore 14 until the lower end of plunger 21 is moved to a position above the inner end of lateral bore 16. When plunger 21 is repositioned above bore 16, liquid is drawn from the reservoir (not shown) into bore 14 by means of the vacuum previously described and bore 14 is thereby recharged in anticipation of the next downward stroke of plunger 21 in response to the next manually controlled pressure actuation of pump 10 in the manner just described.

When pump 10 has operated through a sufficient number of discharge and recharge cycles, in the manner previously described, to displace piston 60 downwardly to a position where annular channel 66 is in register with both of lateral bores 70 and 72, a fluid under pressure is permitted to pass between bores 70 and 72 through circumferential channel 66 for actuating an appropriate lubricant pump (not shown) and thereby lubricating bearing surfaces of the braking system or other apparatus.

As valve piston 60 travels downwardly it drives with its piston rod 61 and connecting arm 101. When piston 60 approaches the lower limit of its permissible travel, arm 101 bears upon spring 99 and exerts a downward force on the upper end of spring 99 a portion of which is transmitted through spring 99 to the upper face of stop nut 106 and valve rod 81. When the downward force so transmitted to valve rod 81 is sufficient to overcome the opposing resultant force of detent springs 95 as exerted upon concave groove 89 through detent balls 94, said balls will be urged from groove 89 and into bores 93, and valve rod 81 will be urged downwardly a sufficient distance for channel 87 to be brought into register with the inner ends of passages 76 and 78. When passages 76 and 78 are in register with circumferential channel 87, balls 94 are in register with groove 89 of piston rod 81 and the force exerted by arm 101 and transmitted through spring 99 to rod 81 is less than the resultant force exerted by springs 95 upon balls 94 and therefore valve channel 87 of rod 81 is retained by balls 94 in the open position previously described.

When valve channel 87 is in the open position, liquid contained above valve piston 60 and within cylinder 52 is permitted to return to the liquid reservoir through bore 54, passage 76, valve channel 87, passage 78 and liquid return conduit 99a and piston 60 is thereby permitted to be moved upwardly by the compressed return spring 63. As piston 60 moves upwardly within cylinder 52 it carries with it piston rod 61 and arm 101. When arm 101 nears the upper limit of its permissible travel the arm engages the lower end of spring 98 and exerts an upward force upon spring 98 a portion of said force being transmitted through the spring and stop nut 105 to rod 81. As soon as the upward force exerted upon rod 81 exceeds the resultant of the forces of springs 95 exerted by balls 94 upon groove 88 of shaft 81, balls 94 are urged from groove 88 and into their respective bores 93. Rod 81 is then permitted to move upwardly within bores 85, 77 and 92 a sufficient distance for repositioning valve channel 87 upwardly and out of communication with passages 76 and 78, thus preventing further return flow of liquid from cylinder 52 to the reservoir and resetting the device for a repetition of the cycle of operation of piston valve means 50 substantially as just described.

When piston 60 is in its uppermost position the flow of fluid between bores 70 and 72 is checked and fluid is permitted to flow between passages 70 and 74 of valve means 50. If conduit 69 is connected as previously described to the actuating conduit of an air or vacuum operated lubricating device (not shown) then conduit 69 is in intercommunication through bore 70, cylinder 52 and bore 74 with atmospheric pressure. Air under pressure within said lubricating device is then exhausted to the atmosphere, or if said lubricating device is evacuated when actuated, then atmospheric pressure is available to said lubricating device. If conduit 69 is connected as previously described for actuating a liquid operated device, bore 74 is connected by suitable conduit (not shown) to a liquid return line and when piston 60 is in its uppermost position said liquid is permitted to be returned to a suitable reservoir through bore 70, cylinder 52 and bore 74.

*First alternative embodiment*

Figure 2:
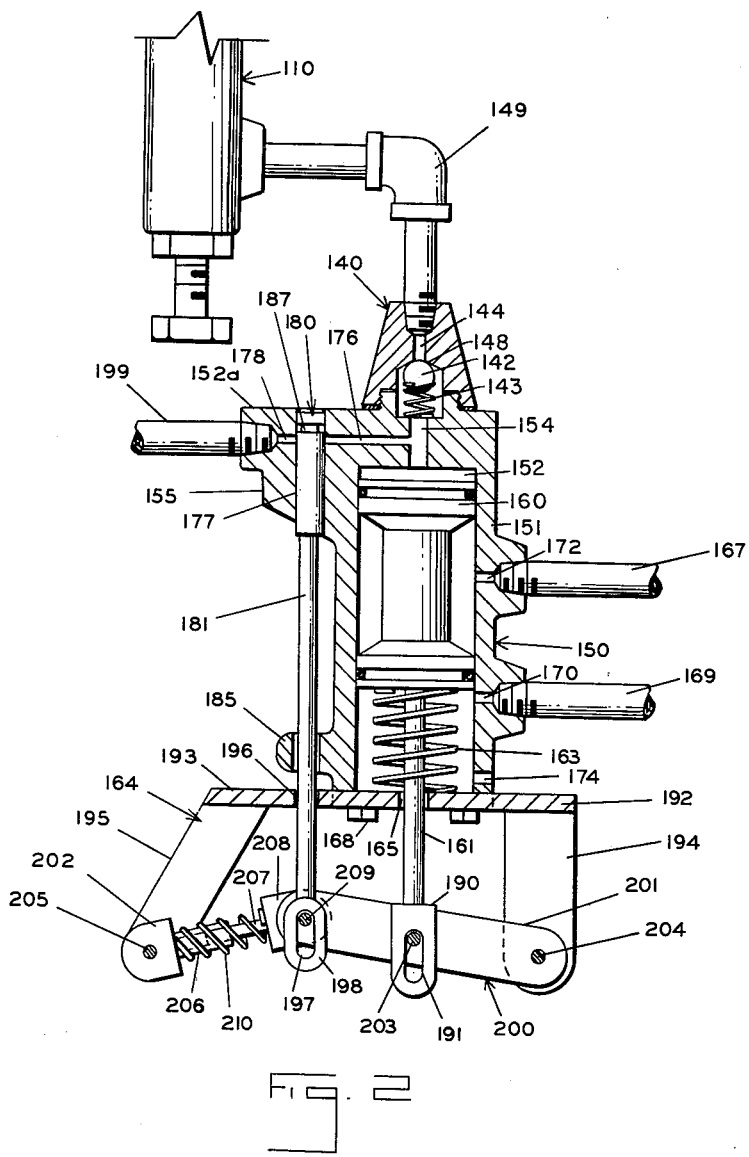

One alternative embodiment of the device of my invention is shown in Fig. 2 with unmodified portions of the device broken away and comprises pump means 110 having substantially the same structure as pump means 10 (Fig. 1) which is described in detail hereinabove, check valve means 140, piston valve means 150, return valve means 180 and return valve actuating means 200, each said means being further described hereafter.

Pump means 110 and check valve means 140 have substantially the same structure as is shown in Fig. 1 for pump means 10 and check valve 40 and as I have previously described herein.

Piston valve means 150 (Fig. 2) comprises valve housing 151, spool piston 160, return spring 163 and retainer means 164, each of which is described hereafter in detail. Housing 151 is formed substantially similar to housing 51 illustrated in Fig. 1 and previously described, except that housing 151 is not provided with an upwardly extending cylindrical boss portion corresponding to boss 75 (Fig. 1) of housing 50 and vertical bore 177 of portion 155 of housing 151 communicates at its upper end with the upwardly disposed plane face 152a of housing 151. Spool piston 160, and return spring 163 are similar in configuration to piston 60 and spring 63 previously described and illustrated in Fig. 1.

Piston rod 161 is formed with any suitable diameter and length and is appropriately secured at one end in axial alignment with piston 160 and extends downwardly from the lower face of said piston. Formed on the lower end of rod 161 is an enlarged portion 190 substantially rectangular in cross-sectional configuration and having a slotted hole 191 formed therein in intercommunication with opposite faces of portion 190.

Retainer means 164 is formed with the general configuration shown in Fig. 2 having an upper shelf portion 192 with an upwardly disposed plane face 193 of suitable size and shape; and having downwardly extending ear portions 194 and 195 of suitable configuration. A vertical bore 165 passes through shelf portion 192 and is in axial alignment with cylinder 152 of housing 151. Vertical bore 196 also passes through shelf portion 192 and is of similar diameter and coaxially aligned with vertical bores 185 and 177 of housing 151. Retainer means 164 is secured to the lower end of housing 151 by suitable fastening means such as cap screws 168.

Return valve means 180 comprises a rod 181 having a diameter slightly less than that of bores 177, 185 and 196 and having any appropriate length. Rod 181 is formed with a circumferential channel 187 similar to channel 87 of valve rod 81 (Fig. 1) and is located adjacent the upper end of rod 181. The lower end of rod 181 is formed with enlarged portion 198 substantially rectangular in configuration and having a slotted hole 197 formed therein in intercommunication with opposite faces of said portion.

Return valve actuating means 200 comprises connecting arm 201 and toggle means 202 each of which is described hereafter. Arm 201 is pivotally secured adjacent its outer end to ear 194 of retainer means 164 by means of an appropriate pivot screw 204. Arm 201 is provided intermediate its length with a suitable tapped hole in register with slotted hole 191 of rod 161 for threadably engaging pivot screw 203 whereby arm 201 is pivotally secured to rod 161. Arm 201 is also provided adjacent its inner end with a pivot hole in register with slotted hole 197.

Toggle 202 is of well known construction having an outer head pivotally secured to ear 195 by means of an appropriate pivot screw 205, an outer tubular portion 206 secured at one end to outer head 202, an inner rod 207 secured at one end to inner head 208 and slidably retained within tube 206. Inner head 208 is provided with a tapped bore suitable for threadably engaging a pivot screw 209 whereby arm 201 and rod 181 are pivotally secured to head 208 of toggle means 202. Toggle spring 210 is a compression spring of well known coil configuration and is disposed concentrically about outer tube 206 and inner tube 207, bearing at its opposite ends on the oppositely disposed heads of toggle means 202 for constantly urging said heads apart.

In operation, pump means 110, check valve means 140 (Fig. 2) and piston valve means 150 function in substantially the same manner as pump means 10 (Fig. 1). When piston 160 travels downwardly in Fig. 2 under the pressure of liquid introduced into cylinder 152 by pump 110, piston rod 161 is driven downwardly, engages pivot screw 203 and thereafter carries with it arm 201 which is thus rotated downwardly about pivot screw 204. Arm 201 also carries with it toggle means 202 which is rotated downwardly about pivot 205. When arm 201 and pivot means 202 are rotated downwardly beyond the position in which pivot screws 205, 209 and 204 are in mutual horizontal alignment toggle means 202 is expanded longitudinally by means of spring 210 and arm 201 is urged to rotate further in a downward direction within the vertical limits of slotted hole 191. When toggle-actuated arm 201 is urged downwardly by toggle means 202, pivot screw 209 is urged against the lower limit of slotted hole 197 and serves to slide valve rod 181 downwardly within bores 177, 185 and 196 and to reposition channel 187 downwardly into a position in which channel 187 is in register with passages 176 and 178. Liquid is then permitted to flow from cylinder 152 to the reservoir in response to upward force exerted thereon by piston 160 which is urged upwardly by return spring 163.

When piston 160 travels upwardly under the force of spring 163, the sequence of operation of return valve actuating means 200 is reversed. As piston 160 approaches the upper limit of its travel, valve channel 187 is repositioned upwardly to close the return valve.

*Second alternative embodiment*

Figure 3:
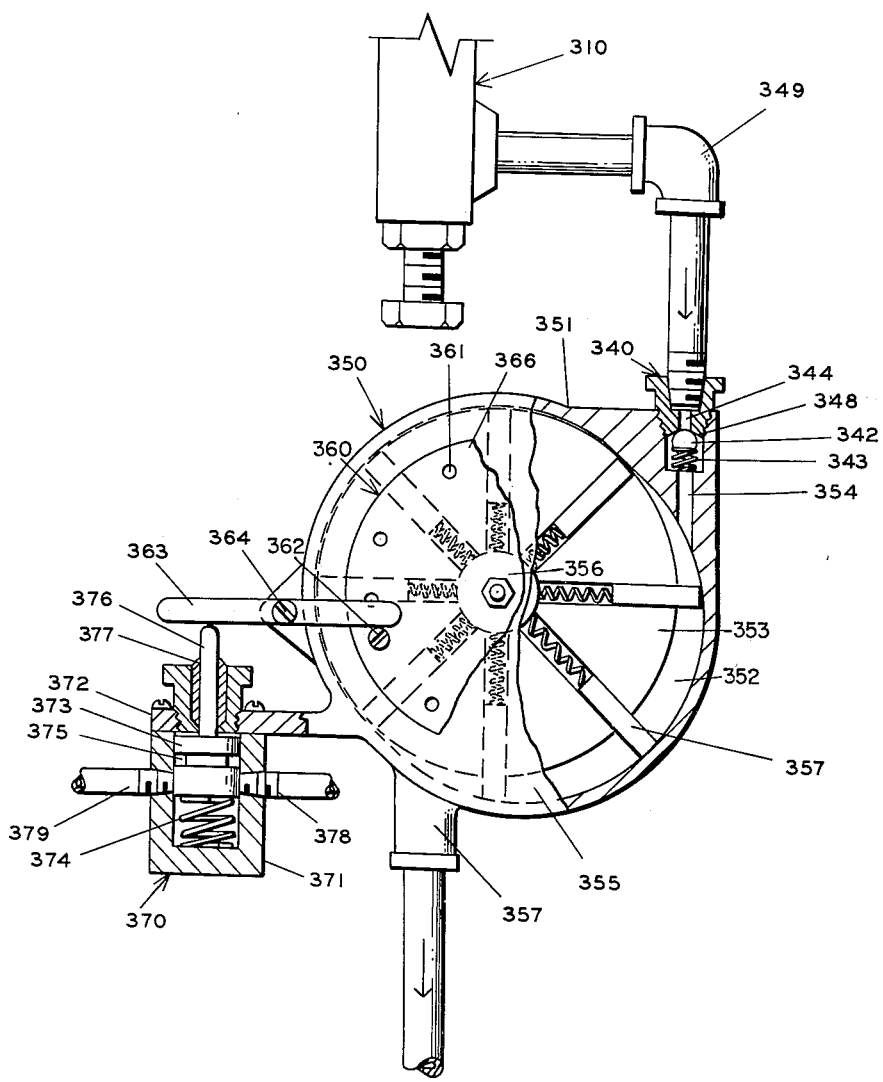

A second alternative embodiment of my invention is shown in Fig. 3 with unmodified portions of the device broken away and with portions of outwardly disposed component elements broken away to reveal interior elements of the fluid motor. The embodiment of Fig. 3 comprises pump means 310, check valve means 340, fluid motor means 350, valve actuator means 360 and piston valve means 370, each of which is further described hereafter.

Pump means 310 and check valve means 340 have substantially the same structure as is shown in Fig. 1 for pump means 10 and check valve means 40 which I have previously described herein.

Fluid motor means 350 is a fluid driven motor of the rotary, sliding vane type well known in the art which comprises housing 351 of substantially cylindrical configuration; cylindrical rotor member 353 eccentrically disposed within housing 351 and rotatably mounted therein by means of a suitable axle 356 secured to rotor 353 and journalled within opposite outer walls 355 of housing 351; fluid inlet passage 354 and fluid outlet passage 357 each of which is in communication at its inwardly disposed end with cavity 352 of housing 350.

Valve actuator means 360 comprises circular plate 366 axially aligned with axle 356 and rigidly secured thereto and having a plurality of tapped bores 361 in communication at their outer ends with the outwardly disposed face of plate 366 and suitably spaced along and adjacent the circumferential edge of said plate; at least one lever engaging pin 362 having one end threadably engaged within a bore 361 and having its opposite end projecting a suitable distance from the face of plate 366; lever 363 pivotally secured by suitable means 364 to housing 351 with one of its oppositely disposed arms extended adjacent plate 366 in a position suitable for at times engaging pin 362.

Any suitable number of lever engaging pins 362 may be threadably secured in any desired relative positions in plate 366 for determining the pattern and frequency of operation of valve 370 with respect to the relative output volume of pump 310 and the input volume of fluid required for angular displacement of rotor 353.

Piston valve means 370 comprises a cylinder 371 secured by suitable means to head 372 which is formed integrally with housing 351 of motor 350; piston 373 slidably reciprocable within cylinder 371 and retained therein by means of head 372 and having a circumferential groove 375; spring 374 which bears at its opposite ends upon the lower plane wall of cylinder 371 and upon one plane face of piston 373 for constantly urging the piston toward head 372; a piston rod 376 secured in axial alignment with the opposite plane face of piston 373, projecting axially from said piston and extending through bore 377 of head 372 sufficiently far to be in constant contact with the outwardly projecting arm of lever 363; inlet conduit 378 and outlet conduit 379 radially disposed about cylinder 371 and spaced longitudinally of said wall in a position suitable for having their inwardly directed open ends in register with groove 375 only when piston 373 is depressed a suitable distance against the force of spring 374.

In operation, pump means 310 and check valve means 340 function in substantially the same manner as pump means 10 and valve means 40 (Fig. 1). When liquid from pump 310 is urged past check valve 340 through passage 354 and into cavity 352, force is exerted upon sliding vane blades 357 causing them to move arcuately about axle 356 and to revolve rotor 353 about said axle in the direction of liquid outlet passage 357 whereby said liquid is returned to a suitable liquid reservoir (not shown).

When rotor 353 is rotated it carries with it circular plate 366 and pin 362 threadably secured to said plate. As pin 362 is rotated in a clockwise direction it is brought into a position of contact engagement with one arm of lever 363, causes lever 363 to rotate about pivot 364 in a counterclockwise direction and to exert downward pressure upon piston rod 376 of valve means 370 and thereby to move piston 373 downwardly against the upwardly biasing force of spring 374. When piston 373 is moved downwardly within cylinder 371 a suitable distance, groove 373 is brought in register with radial conduits 378 and 379, thus permitting actuating fluid to flow from a fluid source (not shown) for actuating one or more fluid actuated lubricating devices of well known design (not shown).

It is to be understood that the above described embodiments of the device of my invention and of its useful application in conjunction with automotive or braking equipment are for the purpose of illustration only and that various changes may be made therein and various uses made thereof without departing from the spirit and scope of my invention.

I claim:

1. A timing apparatus comprising a casing having a passageway; a fluid metering pump means for pumping fluid through said passageway and having an actuating cylinder, a piston reciprocable within said actuating cylinder, a pump cylinder, a plunger in driven engagement with said piston and at times reciprocable thereby within said pump cylinder; a check valve past which fluid may flow in only one direction positioned in said passageway for controlling the passage of fluid through said passageway; a three-way fluid valve means actuated by the passage of fluid through said passageway and through said check valve and having a valve cylinder of greater cross-sectional area than said pump cylinder, a piston valve reciprocable within said valve cylinder in response to relative pressures within said valve cylinder and formed with a laterally disposed concavity registrable at times with a plurality of lateral passages of said valve cylinder, and a piston rod secured to said valve piston and reciprocable therewith; toggle means actuated at times by said piston rod; and means comprising a flow control valve in communication with the passageway and the valve cylinder and actuated by said toggle means for releasing fluid from said passageway and from a portion of said valve cylinder.

2. A timing apparatus comprising a casing having a passageway; a fluid metering pump for pumping fluid through said passageway and comprising an actuating cylinder, a spring biased piston reciprocable within said actuating cylinder by pressure means, a pump cylinder having a pump bore, a plunger in driven engagement with and secured to said piston and at times reciprocable thereby within the pump bore of said pump cylinder, said pump bore being provided with fluid inlet and outlet passages; a check valve past which fluid may flow in only one direction positioned in said passageway for controlling the passage of fluid through said passageway; a three-way fluid valve means actuated by the passage of fluid through said passageway and through said check valve comprising a valve cylinder of greater cross-sectional area than said pump cylinder having a plurality of lateral passages, a piston valve reciprocable within said valve cylinder in response to relative pressures within said valve cylinder and formed with a laterally disposed concavity registrable at times with a plurality of said lateral passages of said valve cylinder, and a piston rod secured to said valve piston and reciprocable therewith; toggle means actuated at times by said piston rod; and means comprising a flow control valve in communication with the passageway and the valve cylinder and actuated by said toggle means and when actuated releasing fluid from said passageway and from a portion of said valve cylinder.

3. The apparatus of claim 2 having a stop pin for adjustably limiting the magnitude of travel of said plunger in one direction.

4. A timing apparatus comprising a casing having a passageway and having a fluid return passage formed in said casing and connected with said passageway; a pressure actuated fluid metering pump means for pumping fluid through said passageway; one-way fluid check valve means past which fluid may flow in only one direction positioned in said passageway for controlling the passage of fluid through said passageway; pressure actuated three-way fluid control valve means actuated by passage of the fluid past said check valve through said passageway and comprising a valve cylinder formed in said casing and connected to said passageway by a pressure inlet passage also formed in said casing and having a plurality of fluid passages extending radially therefrom, and a spring biased valve piston formed with a plurality of oppositely disposed valve heads and with a radially disposed concavity intermediate said valve heads; a piston rod secured to said piston; means comprising a mechanically actuated fluid return valve connected to said fluid return passage to said passageway and having a valve rod provided with a plurality of circumferential grooves adjacent one end of said rod and a circumferentially disposed channel adjacent said grooves for releasing fluid from said passageway and said valve chamber; detent means having a plurality of spring biased balls radially disposed about said valve rod and in contact engagement therewith for at times cooperating with said grooves and retaining said valve rod in one of a plurality of alternative positions longitudinally of a bore formed within said detent means; a return valve actuating arm secured at one of its ends to said piston rod and slidably secured at its opposite end to said valve rod; and stop means provided in adjustable engagement with said valve rod, positioned on opposite sides of said actuating arm and at times engaged by said arm.

5. A timing apparatus comprising a casing having a passageway and having a fluid return passage formed in said casing and connected with said passageway; a pressure actuated fluid metering pump means for pumping fluid through said passageway; one-way fluid check valve means past which fluid may flow in only one direction positioned in said passageway for controlling the passage of fluid through said passageway; pressure actuated three-way fluid flow control valve means actuated by the pressure of the fluid passing through said passageway and comprising a valve cylinder formed in said casing and connected to said passageway by a pressure inlet passage also formed in said casing and having a plurality of fluid passages extending radially therefrom, and a spring biased valve piston formed with a plurality of oppositely disposed valve heads and a radially disposed concavity intermediate said valve heads; a retainer plate secured to the end of said valve cylinder opposite to said pressure inlet passage and formed with an opening; a piston rod secured at one of its ends to said valve piston passing outward through the opening in said plate, and having a longitudinally disposed slotted hole adjacent its opposite end; means comprising a mechanically actuated fluid return valve connected to said fluid return passage and to said passageway and having a valve rod provided with a circumferentially disposed channel adjacent one of its ends and a longitudinally disposed slotted hole adjacent its opposite end for releasing fluid from said passageway and said valve chamber; a connecting arm pivotally secured at one end to said retainer plate and at its opposite end to one end of a spring bias toggle means, said connecting arm having a pivot screw intermediate its opposite end for at times engaging opposite ends of said slotted hole in said piston rod, and one end of said toggle means having a pivot screw secured thereto for at times engaging opposite ends of said slotted hole in said valve rod and pivotally connected to said connected arm.

References Cited in the file of this patent
UNITED STATES PATENTS

| | | |
|---|---|---|
| 1,767,511 | Carr | June 24, 1930 |
| 1,881,857 | Murphy | Oct. 11, 1932 |
| 1,920,003 | Chenault | July 25, 1933 |
| 2,043,826 | Bijur | June 9, 1936 |
| 2,251,323 | Burke | Aug. 5, 1941 |
| 2,337,019 | Abplanalp | Dec. 21, 1943 |
| 2,814,310 | Lower | Nov. 26, 1957 |

UNITED STATES PATENT OFFICE
CERTIFICATE OF CORRECTION

Patent No. 2,981,286                                April 25, 1961

Roy B. Smith

It is hereby certified that error appears in the above numbered patent requiring correction and that the said Letters Patent should read as corrected below.

Column 11, line 59, after "passage" insert -- and --.

Signed and sealed this 26th day of September 1961.

(SEAL)
Attest:

ERNEST W. SWIDER                              DAVID L. LADD
Attesting Officer                                 Commissioner of Patents

USCOMM-DC